United States Patent [19]

Asai et al.

[11] Patent Number: 4,657,814

[45] Date of Patent: Apr. 14, 1987

[54] MAGNETIC RECORDING MEDIUM

[75] Inventors: Takamitsu Asai; Masaaki Fujiyama, both of Kanagawa, Japan

[73] Assignee: Fuji Photo Film Co., Ltd., Kanagawa, Japan

[21] Appl. No.: 553,945

[22] Filed: Nov. 21, 1983

[30] Foreign Application Priority Data

Nov. 22, 1982 [JP] Japan ............................. 58-203737

[51] Int. Cl.$^4$ ............................................. G11B 5/706
[52] U.S. Cl. ................................... 428/329; 427/128; 427/131; 427/132; 428/336; 428/457; 428/458; 428/480; 428/694; 428/900
[58] Field of Search ............... 427/129, 131, 132; 428/694, 900, 458, 64, 457, 480, 328, 329, 323, 336; 360/135, 134, 136

[56] References Cited

U.S. PATENT DOCUMENTS

| | | | |
|---|---|---|---|
| 3,150,939 | 9/1964 | Wenner | 427/131 |
| 4,034,133 | 7/1977 | Fleck | 428/64 |
| 4,254,189 | 3/1981 | Fisher | 428/900 |
| 4,388,368 | 6/1983 | Hibino et al. | 428/900 |
| 4,405,684 | 9/1983 | Blumentritt | 428/64 |
| 4,430,387 | 2/1984 | Nakagawa | 428/64 |
| 4,442,159 | 4/1984 | Dezawa | 427/131 |
| 4,486,496 | 12/1984 | Dezawa | 428/900 |
| 4,511,617 | 4/1985 | Hideyama | 427/131 |

FOREIGN PATENT DOCUMENTS

| | | | |
|---|---|---|---|
| 50-38001 | 12/1975 | Japan | 428/694 |
| 54-111802 | 9/1979 | Japan | 427/131 |
| 55-1651 | 1/1980 | Japan | 428/695 |
| 55-17881 | 2/1980 | Japan | 427/131 |
| 57-167126 | 10/1982 | Japan | 428/900 |
| 1439869 | 6/1976 | United Kingdom | 427/131 |

Primary Examiner—Ellis P. Robinson
Attorney, Agent, or Firm—Sughrue, Mion, Zinn, Macpeak, and Seas

[57] ABSTRACT

A magnetic recording medium is disclosed. The medium is comprised of a support base having provided thereon a non-magnetic metal layer and a magnetic layer. The magnetic layer is comprised of plate-shaped magnetic particles having an axis of easy magnetization perpendicular to the plane of the plate-shaped magnetic particles dispersed in a binder. The non-magnetic metal layer is preferably comprised of a metal selected from the group consisting of Al, Cu, Zn, Sn, Ti and alloys thereof. The recording medium has high S/N ratio, reduced drop out, high output, excellent durability and running properties.

20 Claims, No Drawings

MAGNETIC RECORDING MEDIUM

FIELD OF THE INVENTION

The present invention relates to a magnetic recording medium and, more particularly, it relates to a recording medium with high density and high S/N ratio which is capable of producing high output.

BACKGROUND OF THE INVENTION

Magnetic recording media using metal particles or having metal thin layers provided by vacuum deposition, sputtering or metal plating have been studied for high density recording. Some of these magnetic recording media are now practically used for audio tapes, etc. as disclosed in, for example, U.S. Pat. Nos. 3,047,423, 3,525,638, 3,117,896 and 2,900,282. However, these magnetic recording media do not necessarily have satisfactory stability to rust, oxidation, corrosion, changes in quality and the like which can be detected visually or in magnetic recording properties. In particular, these magnetic recording media have not yet been practically used as video tapes.

SUMMARY OF THE INVENTION

A primary object of the present invention is to provide a magnetic recording medium for high density recording having a high S/N ratio which is capable of producing high output.

Another object of the present invention is to provide a magnetic recording medium having reduced drop out.

A further object of the present invention is to provide a magnetic recording medium having excellent durability with respect to its use during the still mode.

A still further object of the present invention is to provide a magnetic recording medium which does not give rise to magnetic head damage.

Yet another object of the present invention is to provide a magnetic recording medium having good running properties and image qualities without jitter.

The above objects can be achieved by a magnetic recording medium comprising a support base having provided on one surface or both surfaces thereof with a non-magnetic metal layer, and a magnetic layer containing plate-shaped magnetic particles having an axis of easy magnetization perpendicular to the plane of the plate-shaped magnetic particles dispersed in a binder.

DETAILED DESCRIPTION OF THE INVENTION

Magnetic particles used in the present invention include barium ferrite, barium ferrite in which barium or ferrite is partially substituted (i.e., 1 to 10% by weight) with Ca, Sr, Pb, Co, Ni or other metals; MnBi or MnBi in which Mn or Bi is substituted with Se or other metals, i.e., MnSe, BiSe, etc. These magnetic particles are plate-shaped and have an axis of easy magnetization perpendicular to the plane of the plate-shaped particles, as disclosed in U.S. Pat. No. 4,341,648.

The magnetic particles preferably have small diameters because the smaller the diameter of the magnetic particle, the higher the recording density is and the more the noise is decreased. Generally, an average particle diameter is $0.3\mu$ or less and preferably $0.1\mu$ or less. The thickness of the magnetic particles is nearly the same as or lower than the particle diameter. There is no limitation on the lower limit of the thickness, but generally the thickness is ½ to 1/5 that of the particle diameter.

Binders which can be used in the present invention include conventionally known thermoplastic resins, thermosetting resins, reactive type resins or a mixture thereof, as disclosed in, for example, U.S. Pat. No. 4,135,016. A typical example of the binder which can be preferably used in the present invention is a copolymer of vinyl chloride and vinylidene chloride.

Additives which can be used in the magnetic layer include a dispersing agent, a lubricant, an abrasive, an anti-static agent and the like. Specific examples of these additives are disclosed in U.S. Pat. No. 4,135,016.

Materials for the support base used in the present invention are not limited, but polyesters such as polyethylene terephthalate, polyolefins such as polypropylene, cellulose derivatives such as cellulose triacetate or cellulose diacetate and polycarbonates can be used. A preferred example of the support base is polyethylene terephthalate film. The thickness of these support bases is not limited, but is generally about 10 to about 20 $\mu$m.

In the present invention, a layer of non-magnetic metals of Al, Cu, Zn, Sn or Ti or alloys thereof such as Al-Cu, Al-Cu-Zn, Cu-Sn-Zn, preferably aluminum, is provided in a thickness of 0.005 to $0.2\mu$, preferably 0.005 to $0.03\mu$, on at least one surface of the support base. The non-magnetic metal layer can be formed by vacuum deposition, sputtering or ion plating methods which are well known in the art.

In the present invention, the dry thickness of magnetic layer can be 0.5 to 10 $\mu$m, preferably 3 to 5 $\mu$m.

In magnetic recording media, the drop out of the reproduced signal is mainly due to adhesion of dust to the magnetic layer by static charge which is generally accumulated during manufacturing steps such as support base handling, coating, drying, winding, calendering, slitting, mounting of the tape into cassette half and subsequent handling of the product. In conventional magnetic recording media, various types of anti-static agents such as carbon black or graphite are incorporated into a magnetic layer, for example, in an amount of about 3% to about 6% by weight based on the weight of the magnetic particles, in order to minimize the static charge accumulation and to prevent adhesion of dust to the magnetic recording media.

In accordance with the present invention, the static charge accumulation can be reduced by providing a non-magnetic metal layer and, thus, the drop out of the magnetic recording medium can be decreased and the amount of an anti-static agent to be added to the magnetic layer can be decreased. For example, carbon black or graphite can be used in an amount of 3 wt% or less based on the amount of magnetic particles and, in some cases, the amount can be reduced to 1 wt% or less.

In accordance with the present invention, the durability of the tape when used during the still mode can be increased by providing a metal layer due to improvements in running properties and, thus, the amount of binders used in the magnetic layer can be reduced to an extent of about 1/10 or less as compared with the amount used in conventional magnetic recording media.

Also, by providing a metal layer (preferably on both surfaces of the support base), the running properties of the tape can be improved by decreasing sticking of the tape to a rotating cylinder of VTR device due to static charge and, therefore, the amount of lubricating agents can be reduced.

In summary, the amount of additives other than magnetic particles added to the magnetic layer can be decreased by providing metal layer(s) and thus the amount of magnetic particles charged in the magnetic layer can be markedly increased.

The magnetic recording medium according to the present invention has various advantages over conventional magnetic recording media, such as stability, high output, high density recording, high S/N ratio, reduced drop out, long durability when used during the still mode and good running properties without damaging a magnetic head.

The present invention is further illustrated in greater detail by the following Examples, but is not limited thereto. In these Examples, all parts are by weight, unless otherwise indicated.

EXAMPLE 1

| | |
|---|---|
| Barium ferrite in which Fe has been partially substituted with Co (Average diameter: 0.1 $\mu$, plate-shape particle having an average thickness of 0.03 $\mu$, Coercive force: 1320 oersted) | 500 parts |
| Carbon black (anti-static agent) | 5 parts |
| Copolymer of vinyl chloride-vinylidene chloride (Copolymerization ratio, 80:20, Molecular weight: 45,000) | 45 parts |
| Amyl stearate (lubricant) | 10 parts |
| Lecithin (dispersing agent) | 3 parts |
| Methyl ethyl ketone | 500 parts |
| Toluene | 500 parts |

The above composition was mixed and dispersed in a ball mill. 50 parts of polyester polyol was then added thereto and the mixture was mixed until a uniform mixture was obtained. Then, 30 parts of polyisocyanate was added thereto, and the mixture was mixed and dispersed to prepare a hardenable coating composition.

One surface of a polyethylene terephthalate film having a thickness of 15$\mu$ was provided with an aluminum layer in a thickness of 0.05$\mu$ by vacuum deposition and the above coating composition was coated in a dry thickness of 4$\mu$ on the aluminum layer by a gravure roll to prepare a magnetic recording medium (Sample No. 1).

EXAMPLE 2

Both surfaces of a polyethylene terephthalate film having a thickness of 15$\mu$ were provided with an aluminum layer in a thickness of 0.05$\mu$ by vacuum deposition and the same magnetic coating composition as used in Example 1 was coated on one surface of the aluminum layer in a dry thickness of 4$\mu$ by a gravure roll to prepare a magnetic recording medium (Sample No. 2).

COMPARATIVE EXAMPLE

The same magnetic coating composition as used in Example 1 was coated in a dry thickness of 4$\mu$ by a gravure roll on a polyethylene terephthalate film having no vacuum deposited aluminum layer to prepare a magnetic recording medium (Sample No. 3).

The resulting magnetic recording media were tested for video output, drop out, durability when used during the still mode, head damage and image qualities in recording and reproducing, and the results obtained are shown below.

Video output:

A $\beta$-type VTR device was modified to have a half speed (3.5 m/sec) and video outputs were measured using this device.

Measurement wavelength: 6 MHz

| | |
|---|---|
| Output of Sample 1 $\approx$ | +8.5 dB over output of $\beta$-type regular tape |
| Output of Sample 2 $\approx$ | +9 dB over output of $\beta$-type regular tape |
| Output of Sample 3 $\approx$ | +7 dB over output of $\beta$-type regular tape |

Number of drop out:

The drop out was determined by counting the number of drop outs using a VHS type Video tape recorder set on the 2 hour-mode.

Number of drop out of Sample 1=32 per minute [about ⅓ of Sample 3 (Comparative Example)]

Number of drop out of Sample 2=30 per minute [about 1/3.2 of Sample 3 (Comparative Example)]

Durability at still mode (determined in a $\beta$-type VTR):

Still mode durability of Sample 1=30 minutes [about twice of Sample 3 (Comparative Example)]

Still mode durability of Sample 2=30 minutes [about twice of Sample 3 (Comparative Example)]

Head Damage:

The head damage was determined by measuring a decrease in outputs and observing changes in the magnetic head before and after repeated runs for a certain time.

Outputs in Samples 1 and 2 were not decreased after repeated runs for 10 passes. No change was observed on the head. In Sample 3, outputs were decreased with repeated runs and serious damage was observed on the head.

Image quality at recording and reproducing:

As compared with Sample 3, Samples 1 and 2 showed less drop out, jitter and visual image noise and the envelope of wave form of a reproduced signal observed on an oscilloscope was better than that of Sample 3 (Comparative Example).

It is clear from the above results that a magnetic recording medium having high density recording and high S/N ratio can be obtained in the magnetic recording medium of this invention in which a magnetic coating composition containing plate-shaped magnetic particles having an axis of easy magnetization perpendicular to the plane thereof which are dispersed in a binder is coated on a support having a non-magnetic metal layer on one or both surfaces thereof.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having reduced drop out, comprising:
    a non-conductive support base having provided thereon;
    a non-magnetic metal layer which reduces static charge accumulation; and
    a magnetic layer containing plate-shaped magnetic particles having an axis of easy magnetization perpendicular to the plane of the plate-shaped magnetic particles, the particles being dispersed in a binder.

2. A magnetic recording medium as claimed in claim 1, wherein the non-magnetic metal layer is provided on a single surface of the support base.

3. A magnetic recording medium as claimed in claim 1, wherein the non-magnetic metal layer is provided on both surfaces of the support base.

4. A magnetic recording medium as claimed in claim 1, wherein the non-magnetic metal layer is comprised of a metal selected from the group consisting of Al, Cu, Zn, Sn, Ti and alloys thereof.

5. A magnetic recording medium as claimed in claim 4, wherein the alloys are selected from the group consisting of Al-Cu, Al-Cu-Zn and Cu-Sn-Zn.

6. A magnetic recording medium as claimed in claim 4, wherein the metal is aluminum.

7. A magnetic recording medium as claimed in claim 1, wherein the plate-shaped magnetic particles are comprised of barium ferrite.

8. A magnetic recording medium as claimed in claim 1, wherein the plate-shaped magnetic particles are comprised of barium ferrite wherein the barium is partially substituted with an element selected from the group consisting of Ca, Sr, Pb, Co and Ni.

9. A magnetic recording medium as claimed in claim 1, wherein the plate-shaped magnetic particles are comprised of barium ferrite wherein the ferrite is partially substituted with an element selected from the group consisting of Ca, Sr, Pb, Co and Ni.

10. A magnetic recording medium as claimed in claim 1, wherein the plate-shaped magnetic particles are comprised of a material selected from the group consisting of MnBi, MnSe and BiSe.

11. A magnetic recording medium as claimed in claim 1, wherein the non-magnetic metal layer has a thickness in the range of 0.005 to $0.2\mu$.

12. A magnetic recording medium as claimed in claim 1, wherein the plate-shaped magnetic particles have an average particle diameter of $0.3\mu$ or less.

13. A magnetic recording medium as claimed in claim 1, wherein the plate-shaped magnetic particles have an average diameter of $0.1\mu$ or less.

14. A magnetic recording medium as claimed in claim 1, wherein the thickness of the plate-shaped magnetic particles is in the range of ½ to 1/5 of the particle diameter.

15. A magnetic recording medium as claimed in claim 4, wherein the non-magnetic metal layer has a thickness in the range of 0.005 to $0.2\mu$.

16. A magnetic recording medium as claimed in claim 1, wherein the support base is comprised of polyethylene terephthalate.

17. A magnetic recording medium as claimed in claim 1, wherein the support base is selected from the group consisting of a polyester, a polyolefin, a cellulose derivative and a polycarbonate.

18. A magnetic recording medium as claimed in claim 1, wherein the magnetic layer contains an anti-static agent in an amount of less than 3% based on the amount of magnetic particles.

19. A magnetic recording medium as claimed in claim 18, wherein the anti-static agent is present in an amount of 1 wt.% or less.

20. A magnetic recording medium as claimed in claim 1, wherein the magnetic layer contains a binder in an amount which is reduced to an extent of about 1/10 or less as compared with amounts used in conventional magnetic recording media.

* * * * *